United States Patent [19]

Hashimoto et al.

[11] Patent Number: 4,885,816
[45] Date of Patent: Dec. 12, 1989

[54] ROTATING-BRUSH WASHING APPARATUS

[75] Inventors: Masayuki Hashimoto; Manabu Sakamoto; Taizo Tsutsui; Satoshi Satoh; Yukihiko Kouza; Keikichi Murakami, all of Kobe; Tonokatsu Soga; Akira Takeishi, both of Yokohama; Teruhiko Takusagawa, Chiba; Misao Hayashi, Tokyo, all of Japan

[73] Assignees: Kawasaki Jukogyo Kabushiki; Japan Air Lines Co., Ltd., both of Tokyo, Japan

[21] Appl. No.: 228,535

[22] Filed: Aug. 4, 1988

[30] Foreign Application Priority Data

Aug. 4, 1987 [JP] Japan ................................ 62-195110
Aug. 4, 1987 [JP] Japan ............................ 62-119696[U]

[51] Int. Cl.$^4$ ............................ B64F 5/00; B60S 3/06
[52] U.S. Cl. ................................. 15/53 A; 15/21 E; 15/DIG. 2
[58] Field of Search ................... 15/21 R, 21 E, 49 R, 15/49 C, 50 C, 53 R, 53 A, 98, DIG. 2

[56] References Cited

U.S. PATENT DOCUMENTS 3,099,852  8/1963  Grant .................................. 15/21 E
3,439,372  4/1969  Collier .
3,665,542  5/1972  Franzreb .
3,680,164  8/1972  Thornton-Trump .
3,835,498  9/1974  Arato .
4,499,624  2/1985  Bloome .
4,570,278  2/1986  Bloome .

FOREIGN PATENT DOCUMENTS 2317287  10/1973  Fed. Rep. of Germany ...... 15/21 E
1403051   5/1965  France ................................ 15/21 E
A2488157  2/1982  France .
A1327901  8/1973  United Kingdom .

Primary Examiner—Edward L. Roberts
Attorney, Agent, or Firm—Marshall, O'Toole, Gerstein, Murray & Bicknell

[57] ABSTRACT

A washing apparatus, particularly for use on airplanes, comprising a carriage, a support, a mechanism connecting the carriage with the support for moving the support up and down on the carriage, a swing arm extending generally horizontally, a frame pivotably mounted on the swing arm and extending upwardly from the swing arm, a brush rotatably mounted on the upper end of the frame, and a mechanism connecting the swing arm to the support for swinging movement of the swing arm on the support. The apparatus may further include a cover at least partially surrounding the brush.

8 Claims, 4 Drawing Sheets

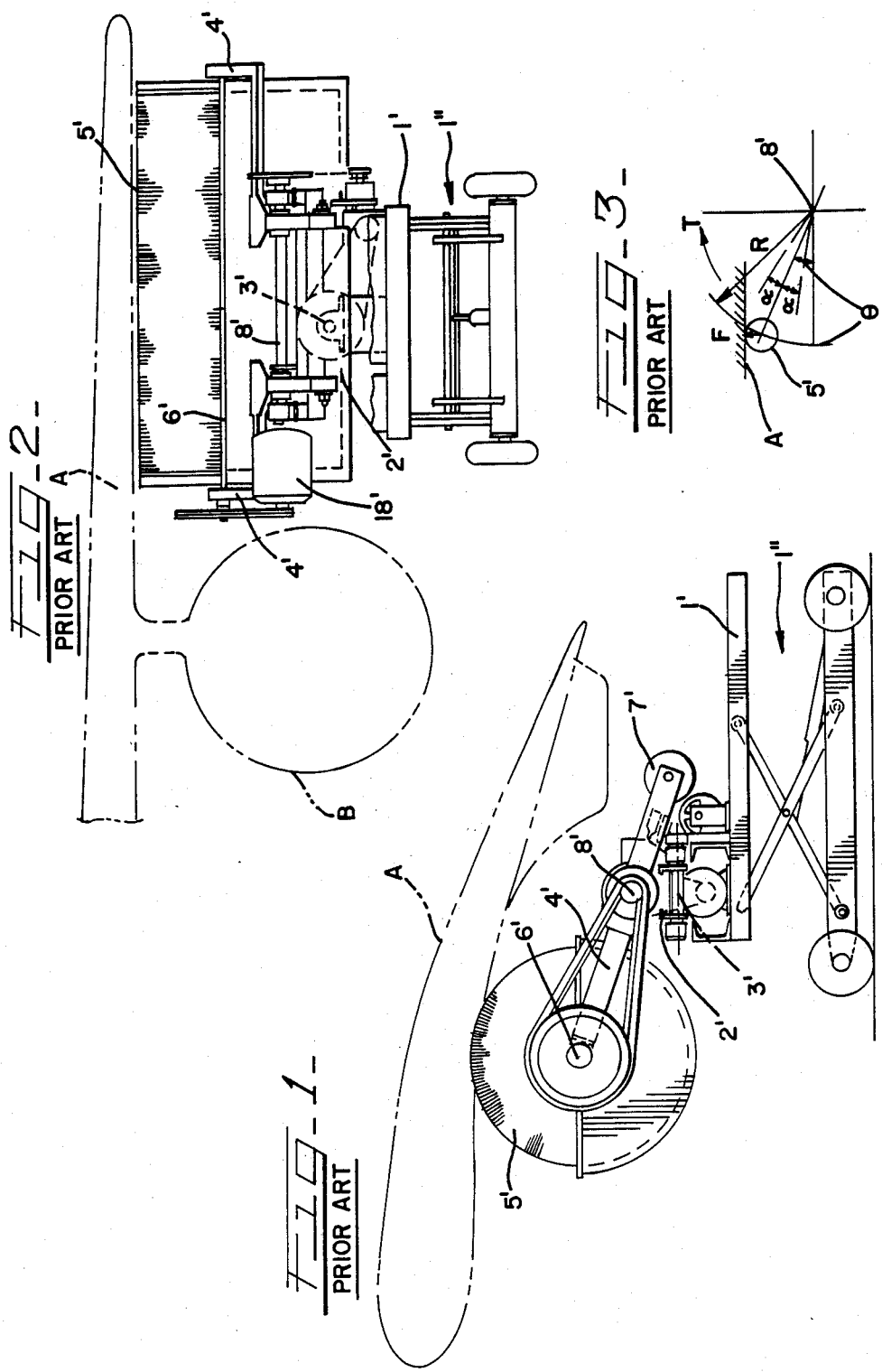

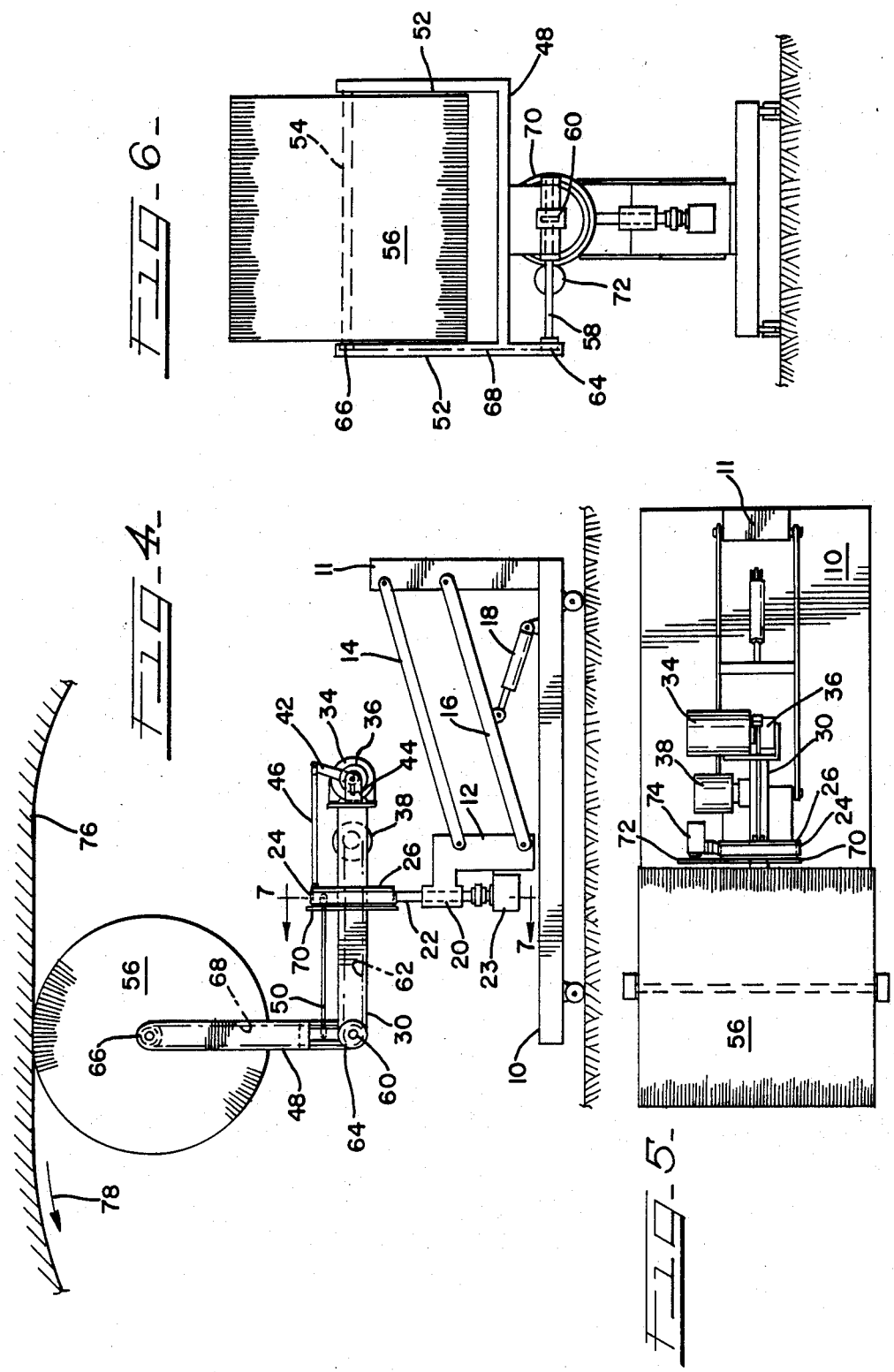

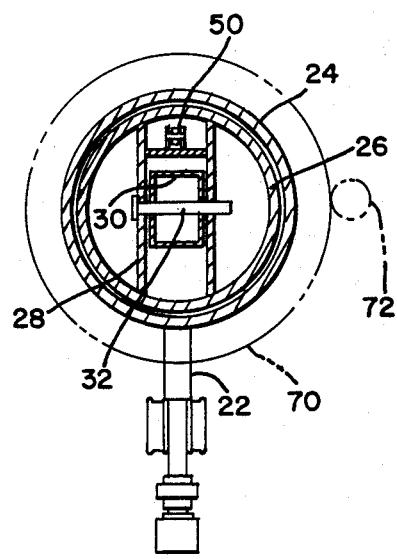
FIG-7-
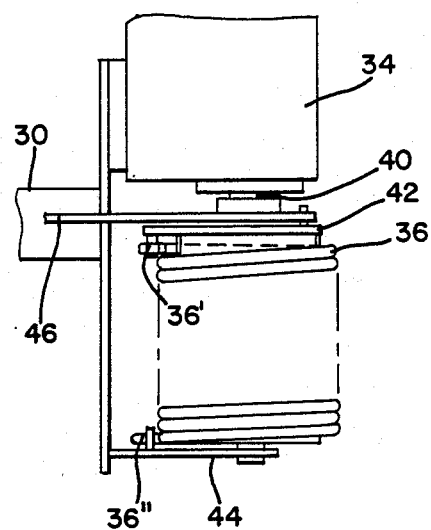
FIG-8-
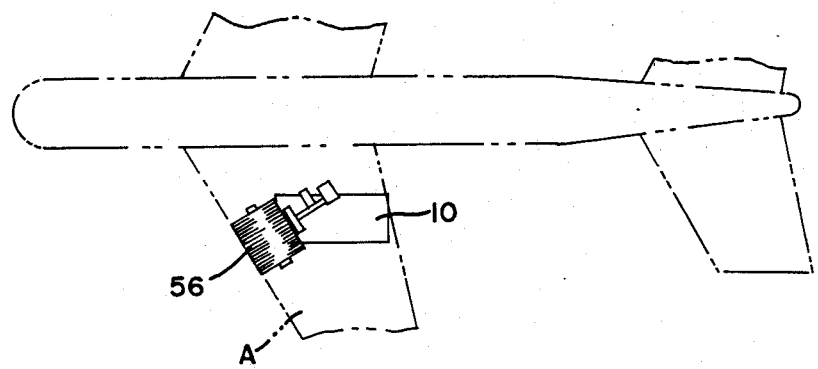
FIG-9-
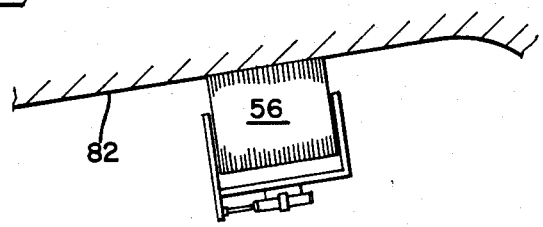
FIG-10-

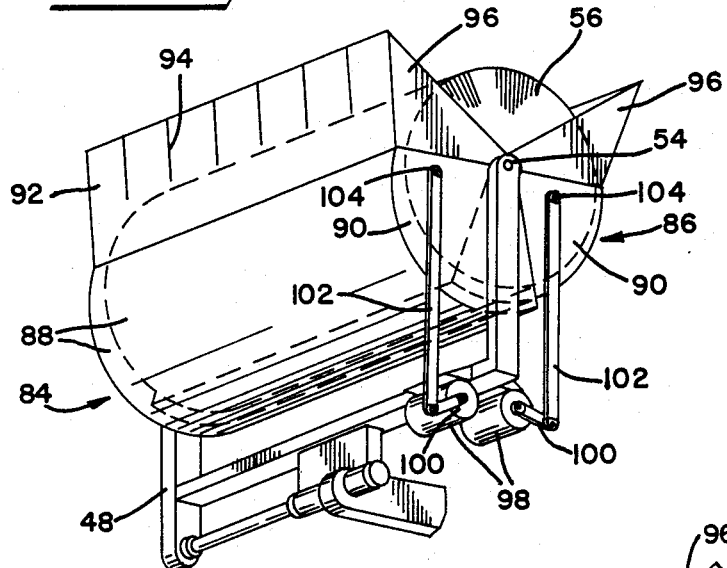
FIG_11_
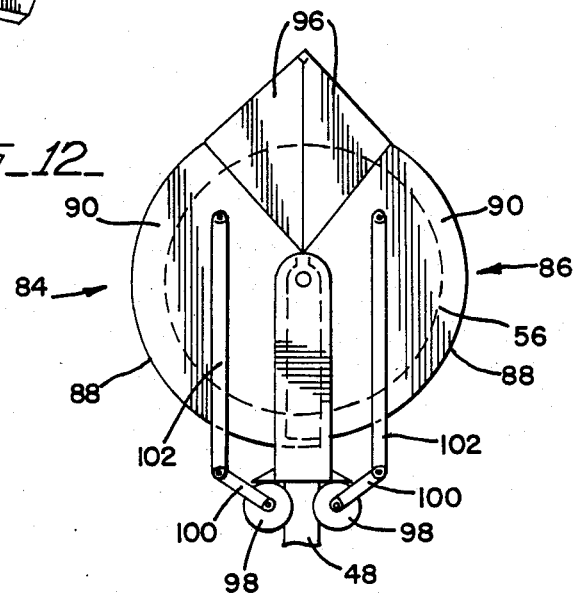
FIG_12_
FIG_13_
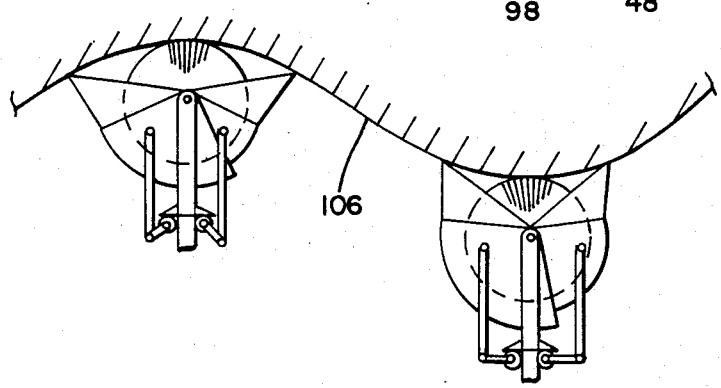

4,885,816

ROTATING-BRUSH WASHING APPARATUS

FIELD AND BACKGROUND OF THE INVENTION

This invention relates to a rotating-brush washing apparatus which is particularly useful for washing airplanes, constructed so that a brush part of the apparatus swings or tilts in accordance with the shape of the surface being washed.

FIGS. 1 and 2 of the accompanying drawings show the prior art type of washing apparatus which is in common use for washing airplanes, etc. This apparatus includes a base 1' adapted to be moved up and down by a scissors mechanism 1" on a wheeled platform, and a bed 2' supported on the base 1' via a shaft 3' so that it is capable of a rolling movement from side to side. Two swing arms 4', one on each side, are swingably supported by a shaft 8' on the bed 2'. On the front ends of the arms 4' is supported a shaft 6', on which a roll-shaped rotatable brush 5' is mounted.

On the base or rearward ends of swing arms 4' is mounted a balance weight 7' for balancing the weight of the brush 5', shaft 6', etc. which are mounted on the front ends of the arms 4'. The rotation of a motor 18' mounted on one arm 4' is transmitted via a belt and pulley arrangement to the shaft 6' so that the brush 5' rotates during a washing operation.

Thus, when washing an inclined surface such as the underside of the wings of an airplane (in FIGS. 1 and 2, a wing is indicated by the letter A and an engine is indicated by the letter B), which incline from where the wings are attached to the fuselage toward the tips of the wings, the bed 2' rotates around the shaft 3' and the washing is performed with the surface of brush 5' following along the inclined surface. Also, when washing a surface which inclines in a direction at a right angle to the axis of brush 5' (as illustrated in FIG. 1), the arms 4' swing on the shaft 8' in accordance with the inclination of the surface.

With such a conventional apparatus, there is the drawback that, because the balance weight is necessary, the total weight of the apparatus is increased, thus necessitating larger structural members and larger power systems for the apparatus.

In addition, as shown in FIG. 3, if the swing torque T of arms 4' is constant, the pressing force F of the brush on the surface being washed will vary in accordance with the change in the angle of inclination of the swing arms. In order to minimize the fluctuation of the pressing force F, it is preferable for the inclination angle to be zero, as shown by the following equation:

$$F = \frac{T}{R \cos(\theta \pm \alpha)}$$

where R is the distance between the shafts 6' and 8', $\theta$ is the initial inclination angle of the arms 4', and $\alpha$ is the angle of swing. The angle $\alpha$ is the angle of pivotal movement of the arms 4 required by the changing angle of the surface being washed. However, because the balance weight 7' and any other balance mechanism protrude upward, it is difficult for the inclination angle to be made zero. Thus, in this case, in order for the pressing force F to be constant, the swing torque T to be applied to the swing arms must be varied, and for this function a control device would be required.

It is a general object of this invention to provide a rotating-brush washing apparatus which avoids the above drawbacks.

SUMMARY OF THE INVENTION

Washing apparatus in accordance with this invention comprises:

a carriage, a support supported by said carriage for movement in the up and down direction, an outer ring supported by said support so that the axis of said ring extends horizontally, and so that said ring is rotatable around a vertical axis extending radially of said ring, an inner ring supported coaxially by said outer ring for rotation relative to said outer ring, a swing arm extending through and supported by said inner ring swingably around a swing axis, a frame supported pivotably on said arm adjacent one end of said arm, a roll-shaped brush supported rotatably by said frame so that the axis of said brush extends in parallel with said swing axis, drive means and swing enabling means mounted on said arm adjacent the other end of said arm, said drive means being connected in driving relation with said brush, said swing enabling means having a shaft in parallel with said swing axis, said shaft being adapted to be rotated in one direction, a lever fixed to said shaft, a first link interconnecting one end of said lever and said inner ring so as to form a four-section link mechanism, which forces said arm to turn around said swing axis when said shaft rotates, and a second link interconnecting said inner ring and said frame so as to form another four-section link mechanism, which holds said frame in a vertical plane.

BRIEF DESCRIPTION OF THE DRAWINGS

The invention will be better understood from the following detailed description taken in conjunction with the figures of the accompanying drawings, wherein:

FIGS. 1 and 2 are respectively side and rear views of a prior art airplane washing apparatus;

FIG. 3 shows the inclination angle of the swing arms of the conventional apparatus, the torque applied to the arms, and the pressing force of the brush of the apparatus against the surface being washed;

FIGS. 4-6 are respectively side, top plan and front views of an airplane washing apparatus according to one embodiment of the present invention;

FIG. 7 is an enlarged fragmentary cross-sectional view taken along the line 7—7 of FIG. 4;

FIG. 8 is an enlarged and more detailed view of part of FIG. 5;

FIG. 9 is a schematic plan view showing the apparatus of this embodiment in operation when washing an airplane;

FIG. 10 is a schematic front view showing the apparatus while in operation;

FIG. 11 is a perspective view of part of a washing apparatus according to an alternative embodiment of the invention;

FIG. 12 is a side view of the apparatus of FIG. 11, but with the covers closed;

FIG. 13 is a side view showing the operation of apparatus according to this embodiment in operation.

DETAILED DESCRIPTION OF THE DRAWINGS

With reference to FIGS. 4–6, the apparatus includes a cart or carriage 10 having a vertical support member 11 at its rearward end. On the member 11 is supported a block 12 which is movable up and down by a pair of spaced upper and lower parallel links 14 and 16 which are pivotably connected to the vertical member 11. The member 11, the block 12 and the links 14 and 16 form a four-section parallel link mechanism. An electrically powered cylinder 18 is mounted at one end to the cart 10, and its piston is mounted to an intermediate point of lower link 16, so that the links and the block 12 may be swung up and down.

The block 12 has a bearing 20 for rotatably supporting a vertical shaft 22 which is adapted to be driven by a motor 23 mounted on the block 12. To the top end of shaft 22 is fixed an outer ring 24, as best shown in FIG. 7, arranged so that the axis of the ring 24 extends substantially horizontally. An inner ring 26 is supported coaxially inside the outer ring 24 so as to be rotatable along the inner periphery of the outer ring. As shown in FIG. 7, to the inner periphery of inner ring 26 is secured a mount 28 formed by two vertical plates, on which a generally horizontal swing arm 30 is pivotably supported by a generally horizontal pin 32. The arm 30 extends through the ring 26 about equal distances in the forward-rearward direction.

As shown in FIGS. 4, 5 and 8, on the rearward end of swing arm 30 are mounted a torque motor 34 and a torsion coil spring 36, which act as swing enabling means. Also mounted on the arm 30 adjacent this end is a brush drive motor 38.

The torque motor 34 has an output shaft 40 (FIG. 8) extending in parallel with the pin 32. The motor 34 is adapted to rotate the shaft 40 counterclockwise as seen in FIG. 4.

The spring 36 is wound around the output shaft 40. One end 36' of the spring 36 is fixed to one end (see FIG. 8) of a lever 42 fixed to the shaft 40, and the other end 36" of spring 36 is fixed to a bracket 44 fixed to the swing arm 30, so as to urge the shaft 40 to rotate also counterclockwise.

The outer end of the lever 42 is connected with the inner ring 26 by a link 46 (FIG. 4). The swing arm 30, including the torque motor 34 and the other parts joined to it, the lever 42, the link 46, the ring 26 and the mount 28 form a four-section parallel link mechanism.

On the other or forward end of the swing arm 30 is pivotably supported a frame 48, which is connected with the inner ring 26 by a link 50 (FIG. 4) connected to the mount 28. The arm 30, the frame 48, the link 50 and the mount 28 form another four-section parallel link mechanism, which holds the frame 48 in a vertical plane in parallel with the radial planes of the rings 24 and 26.

As best shown in FIG. 6, the frame 48 includes two vertical side members 52, which journal a shaft 54 adjacent their top ends. A roll-shaped brush 56 is fixed to this shaft 54.

On the forward end of the swing arm 30 adjacent the brush 56 and a downward extension of one side member 52 is journalled a shaft 58, which extends in parallel with the brush shaft 54.

The shaft 58 is coupled in driving relation with the brush drive motor 38 via a sprocket 60 (FIG. 4) fixed to the shaft 58, and a chain 62 housed in the swing arm 30 and coupled by a sprocket to the motor 38. The shaft 58 is also in driving relation with the brush shaft 54 via a sprocket 64 fixed to the shaft 58, a sprocket 66 fixed to the shaft 54, and a chain 68 housed in the side member 52.

The inner ring 26 protrudes a short distance axially toward the brush 56 from the outer ring 24. To this protruding end is fixed a ring gear 70, which meshes with a sprocket 72 (FIGS. 5 and 6) of a brush inclination motor 74 mounted on the outer ring 24. This enables the swing arm 30 to be inclined or roll around its longitudinal axis.

In operation, the cylinder 18 extends or contracts to raise or lower the block 12 so that the brush 56 makes appropriate contact with the surface 76 (FIG. 4) to be washed, which may be the underside of a wing of an airplane.

Next, the torque motor 34 is operated to turn the swing arm 30 clockwise as seen in FIG. 4 around the pin 32 (FIG. 7), with the frame 48 kept in a vertical plane, thus pressing the brush 56 against the surface 76 (since the left end of the link 46 is secured to the inner ring, turning movement of the motor 34 and the lever 42 will cause the swing arm 30 to tilt, but the parallel arm arrangement holds the frame 48 vertical). In this state, the brush 56 is rotated by operating the motor 38 to accomplish the washing of the surface.

During the washing process, if, as shown in FIG. 4, the surface 76 is inclined downwardly in the direction of travel indicated by arrow 78, the amount of depression of the brush 56 biased by the motor 34 and the spring 36 gradually increases as the washing apparatus moves. At the same time, the reaction force from the surface 76 increases and overcomes the pressing force, thus turning the swing arm 30 counterclockwise and moving the brush 56 downardly along the inclined surface.

As shown in FIG. 9, in order to perform the washing operation with the brush 56 directed at a slant with respect to the direction of travel of cart 10, the vertical shaft 22 simply ha to be turned by operating the motor 23 in order to slant the brush 56 in the horizontal plane.

As shown in FIG. 10, if the surface 82 to be washed, which may be the underside of the wings of an airplane, is inclined to the right or left (at right angles to the direction of travel), by energizing the motor 74 and thereby rotating the inner ring 26 with respect to the outer ring 24, the brush 56 can be inclined right or left.

With this washing apparatus, because the weights at the two ends of the swing arm 30 are balanced by appropriate positioning of the brush 56, the frame 48, etc. on one end and the drive motor 38, torque motor 34 and spring 36 on the other end, the need for a balance weight is eliminated. Consequently, the parts may be made extremely lightweight, and it is possible for structural members having small section moduli to be used to support them, thus making it possible to greatly reduce the overall weight of the apparatus.

Because the weights at the two ends of the swing arm 30 are balanced, and also because the torsion spring 36 is provided in addition to the torque motor 34 in order to provide supplementary force, the brush can be swung by a low-capacity torque motor. Furthermore, because the moment of inertia ($GD^2$, where G is the gravity of the rotor and D is its diameter) of the motor can be reduced as a result of the design described above, the swing responsiveness is improved.

Because the drive means and swing enabling means, which also fulfill the role of a balance weight, are sufficiently spaced from the surface being washed, these parts do not come close to the surface being washed.

Since a turning means is provided so that the brush can also be swung within a horizontal plane, it is possible, as shown in FIG. 9, to maintain the brush in uniform contact with the surface being washed even in areas such as the edges of the wings of an airplane.

The brush drive section, the torque motor, and the other components are connected to the inner ring, which is mounted to rotate relative to the outer ring which is mounted on the block side, and therefore there are no restrictions on the angle of inclination of the brush.

Because the apparatus requires no balance weight, etc., the weight of the entire apparatus is decreased, thus allowing both smaller structural members and smaller power systems to be used in the apparatus. Therefore, in contrast with the prior art, this apparatus can be manufactured at lower cost and operated using smaller amounts of energy, and also transportation and other movement can be accomplished with greater ease.

Still further, the brush is mounted on the swing arm via the frame 48, and therefore it is possible for the inclination angle θ (FIG. 3) of the swing arm to be zero during the washing operation, thus making it possible to obtain a constantly uniform pressing force against the surface being washed, even if the torque of the arm is constant.

FIGS. 11 to 13 show a cover which may be provided for the washing apparatus described above to prevent water drops from dispersing. The frame 48 supporting the brush 56 is substantially the same as shown in FIGS. 4–6.

The cover includes a pair of split outer and inner halves 84 and 86, each having a cylindrical wall 88 and arcuate end walls 90. The end walls are supported by the shaft 54 which also supports the brush so that the cylindrical walls 88 are rotatable around the brush 56. The halves are suitably larger in diameter and length than the brush 56 so as to enclose the brush. The outer half 84 is slightly larger in diameter and length than the inner half 86 so that one may rotate in the other.

On the frame 48 are mounted a pair of motor drives 98. The output shaft of each drive 98 is connected via levers 100 and 102 to a pin 104 fixed to one end wall 90 of one of the halves 84, 86. The halves are supported to overlie one another at the bottom edge and to open at the upper edge.

To the open upper axial edge of each cylindrical wall 88 is fixed a rectangular flexible sheet member 92 (FIG. 11), which has a number of slits 94 formed in it. At the open radial edge of each end wall 90 is fixed a triangular flexible sheet member 96 forming end parts of sheet 92.

When the apparatus is not in use, as shown in FIG. 12, the drives 98 are operated to turn the covers 84 and 86 until the free edges of flexible sheets 92 and 96 engage to enclose the brush 56. Then, the covers 84 and 86 are preferably locked by a conventional lock (not shown). This prevents the brush 56 from being exposed to dust, ultraviolet rays, snow, etc. when not in use. Any dust on the brush may damage the surface being washed.

In operation, as shown in FIG. 13, the cover halves 84 and 86 are unlocked and opened so that the brush 56 and the free edges of rectangular sheets 92 contact the surface 106 to be washed. The apparatus is then moved along the surface 106, with the brush 56 being rotated and the cover halves turned according to the shape of the surface 106 so that the free edges of sheets 92 follow the surface.

Thus, the cover halves can follow the change of condition of the surface resulting from the variation in the relative position of the surface and brush. At the same time, washing water and cleanser is supplied within the cover by means of spray nozzles (not shown) provided on the cover halves.

Thus, the washing by the brush 56 is performed substantially within the cover members, thereby preventing water drops from dispersing, regardless of the shape of surface 106. The slits 94 of the sheets 92 enable the sheets to pass over relatively large projections on the surface 106 without applying forces to the projections and damaging them.

The positions of the covers and the associated parts may be controlled with distance-measuring sensors (not shown) etc. mounted on the covers.

What is claimed is:

1. Washing apparatus comprising:
a carriage,
a support and means for mounting said support on said carriage for movement up and down,
an outer ring fastened to said support so that the axis of said outer ring extends substantially horizontally, and means connected to said outer ring and said support so that said ring is rotatable around a substantially vertical axis extending radially of said ring,
an inner ring supported coaxially by said outer ring and rotatable relative to said outer ring,
a swing arm extending through and supported by said inner ring for swinging movement on a swing axis,
a frame supported pivotably on said swing arm adjacent one end of said swing arm,
a roll-shaped brush supported rotatably by said frame so that the axis of said brush extends substantially in parallel with said swing axis,
drive means and swing enabling means mounted on said swing arm adjacent the other end of said swing arm, said drive means being connected in driving relation with said brush,
said swing enabling means including a shaft in parallel with said swing axis, said shaft being adapted to be rotated in one direction,
a lever fixed to said shaft,
a first link interconnecting one end of said lever and said inner ring so as to form a four-section link mechanism, which forces said arm to turn around said swing axis when said shaft rotates, and
a second link interconnecting said inner ring and said frame so as to form another four-section link mechanism, which holds said frame in a substantially vertical plane.

2. The apparatus of claim 1, wherein said swing enabling means comprises a coil spring connected between said swing arm and said lever to urge said shaft to rotate in said one direction, and a torque motor coupled to said shaft to rotate said shaft in the same direction.

3. The apparatus of claims 1 or 2, which further comprises cover means mounted on said frame and including cover halves which at least partially surround said brush, said cover halves being openable to form an opening which extends axially of said brush and form open edges on both sides of the axis of said brush.

4. The apparatus of claim 3, and further comprising a pair of flexible sheet members attached to said open edges, said cover halves being extensible to engage the free edges of said sheet members together, and said cover halves being retractable to disengage said free edges and expos said brush.

5. Washing apparatus comprising:
a carriage,
a support,
first means connecting said carriage with said support for moving said support up and down on said carriage,
a swing arm extending generally horizontally,
a frame pivotally mounted on said swing arm and extending upwardly from said swing arm,
a brush rotatably mounted on the upper end of said frame,
second means connecting said swing arm to said support for swinging movement of said swing arm on said support, and
link means connecting said frame with said second means for maintaining said frame in a substantially upwardly extending position.

6. Washing apparatus as set forth in claim 5, wherein said second means is connected to said support for moving said swing arm on a substantially vertical axis.

7. Washing apparatus as set forth in claim 5, and further including third means connected to said swing arm and said second means for swinging said arm on a substantially horizontal axis.

8. Washing appartus as set forth in claims 5, 6 or 7, and further including cover means at least partially surrounding said brush.

* * * * *